US009623970B1

(12) United States Patent
Mern et al.

(10) Patent No.: US 9,623,970 B1
(45) Date of Patent: Apr. 18, 2017

(54) METHODS AND APPARATUSES FOR PAYLOAD DEPLOYMENT USING LOW-FORCE RELEASE AND REPLACEMENT OF OUTER MOLD LINE PANEL

(71) Applicant: The Boeing Company, Chicago, IL (US)

(72) Inventors: John Michael Mern, St. Louis, MO (US); Jacob R. Irwin, St. Peters, MO (US)

(73) Assignee: THE BOEING COMPANY, Chicago, IL (US)

( * ) Notice: Subject to any disclaimer, the term of this patent is extended or adjusted under 35 U.S.C. 154(b) by 21 days.

(21) Appl. No.: 14/881,355

(22) Filed: Oct. 13, 2015

(51) Int. Cl.
*B64D 1/12* (2006.01)
*B64D 1/06* (2006.01)

(52) U.S. Cl.
CPC ...... *B64D 1/12* (2013.01); *B64D 1/06* (2013.01)

(58) Field of Classification Search
CPC ... B64D 1/00; B64D 1/02; B64D 1/04; B64D 1/06; B64D 1/08; B64D 1/10; B64D 1/12; B64C 2201/121; B64C 2201/128
See application file for complete search history.

(56) References Cited

U.S. PATENT DOCUMENTS

| 2,749,064 | A | * | 6/1956 | Kuhlman, Jr. | ............ | B64D 1/06 244/130 |
| 6,460,445 | B1 | * | 10/2002 | Young | ...................... | B64D 1/06 244/137.4 |
| 2010/0140406 | A1 | * | 6/2010 | Walton | ...................... | B64D 1/06 244/129.5 |
| 2016/0368603 | A1 | * | 12/2016 | Dornwald | ............... | B64C 39/10 |

* cited by examiner

*Primary Examiner* — Richard G Davis
(74) *Attorney, Agent, or Firm* — Coats & Bennett, PLLC

(57) ABSTRACT

Methods, apparatuses and systems are disclosed relating to maintaining an outer mold line of a vehicle after a payload is deployed from the vehicle, and providing a low-force non-frangible method of deploying a payload from a vehicle.

20 Claims, 10 Drawing Sheets

METHODS AND APPARATUSES FOR PAYLOAD DEPLOYMENT USING LOW-FORCE RELEASE AND REPLACEMENT OF OUTER MOLD LINE PANEL

TECHNOLOGICAL FIELD

The present disclosure relates generally to the field of vehicle construction, and, more specifically, to improved methods, apparatuses and systems for deploying payloads from a vehicle.

BACKGROUND

Payload deployment from the interior of vehicles, including, for example, manned and unmanned aircraft/spacecraft vehicles typically employs complex payload deployment systems that either significantly add to a vehicle's weight, take up space that reduces payload volume, risk damaging payload, and/or permanently impacts the outer mold line (OML) of the vehicles. One category of known payload deployment systems incorporates a complex hydraulic system capable of opening and closing doors. Such systems comprise multiple complex hinging and actuating components that take up volume in the payload compartment and add to a vehicle's overall weight. Further such deployment systems may take longer than desired to deploy a payload, and cannot be scaled effectively to smaller vehicle platforms. In addition, such systems may be impractical for deploying payloads from rapidly moving objects, such as, for example, from vehicles, including payload-carrying projectiles, moving at very high velocities.

Known payload deployment systems from such fast moving objects have deployment systems that typically comprise a transferring release force delivered through a payload, to release the payload from the vehicle/object. These known deployment systems typically employ a charge or otherwise incorporate a mechanical means capable of tremendous force, as an outer panel or hatch is forced to disengage from the vehicle. These systems often leave an open cavity, disrupt the profile of the skin, or otherwise adversely interrupt the OML of the vehicle structure. Such OML interruption can significantly degrade or permanently destroy aerodynamic performance of the vehicle, and often are only employed during end of flight maneuvers.

Other payload deployment systems comprise frangible panel and/or bolt systems that break apart and release from a vehicle when subjected to a predetermined force. A material or component is said to be frangible if it breaks up or shatters into multiple pieces upon being subjected to a predetermined force. In the arena of known payload deployment systems, frangible systems include frangible panel systems and frangible bolt systems as frangible disengagement mechanisms, and include the use of frangible elements where a force imparts a shock and compression load to the payload structure that then is transferred to the bolt, or other retaining system. In these systems, the force required to successfully release the payload from a vehicle is therefore practically limited to the maximum impulse a payload can sustain without failure, thus reducing the final exit velocity of the payload. In addition, the use of these frangible systems risks damaging the payload during its release from the vehicle.

Another typical payload release system employs explosive elements. This type of system may reduce the force required to release the payload from the vehicle, but a high level of shock is still sustained by the payload in the over-pressured condition required to effect payload release from the vehicle.

In known frangible deployment systems, as described above, a cavity is left in the vehicle, thus disturbing the aerodynamics of the OML and consequently severely degrading aerodynamic performance of the vehicle, and potentially rendering the vehicle incapable of continued controllable flight. Therefore, disruption to the OML causes many significant and adverse conditions to the vehicle in terms of performance after payload deployment, including, without limitation, impact to vehicle stability, fuel efficiency, range, continued flight, etc.

In addition, in known frangible deployment systems, a significant force is required and delivered. Consequently, in such systems, since the same actuator (e.g. airbag, explosive actuator, etc.) is used to both remove an outer door/panel and eject the payload, a significant force is also imparted on the payload being deployed. This peak force required to accomplish the liberation of the payload and break the frangible component(s) is often greater than the force required to achieve a desired payload velocity.

Improved methods, apparatuses and systems for payload deployment from payload-bearing vehicles and objects (especially high-velocity vehicles and objects) that do not adversely impact the OML of the vehicle/object after payload deployment, and that provide payload deployment with a low-force that does not risk damage to the payload would be highly desirable.

BRIEF SUMMARY

According to one aspect, the present disclosure is directed to a method for deploying a payload from a vehicle comprising positioning a first panel at a first panel location, with the first panel comprising a first panel outer surface configured to substantially conform to a vehicle outer mold line, with the first panel in communication with at least one release mechanism; positioning an internal structure within the vehicle, with the internal structure comprising a movable second panel positioned at a second location and in a first plane, with the movable second panel positioned adjacent to at least one wall, with the wall configured to substantially surround the movable second panel, and with the wall positioned in a second plane different from the first plane, and with the moveable second panel and the substantially surrounding wall bounding a cavity. The cavity is configured to contain a payload, with the first panel configured to close the cavity. A payload is positioned in the cavity, with the payload having an upper surface adjacent to the second panel. A driving force mechanism is positioned and configured to deliver a force to at least one release mechanism, with the force being adequate to activate the release mechanism. The release mechanism is activated to release the first panel from the vehicle. The payload is then substantially simultaneously released from the cavity. The movable second panel is repositioned from the second location to the first location to replace the first panel, with the second panel comprising a movable second panel outer surface configured to substantially conform to the outer mold line of the vehicle when the movable second panel is positioned in the first location.

In another aspect, a method for deploying a payload from a vehicle is disclosed comprising the steps of substantially maintaining an outer mold line of the vehicle after payload deployment by positioning a first panel at a first location, said first panel having a first panel outer surface, said first panel located proximate to a payload cavity; activating a driving force mechanism to deliver a low-force necessary to activate a reusable release mechanism; deploying the first panel from the vehicle and deploying the payload from the vehicle; and replacing the deployed first panel with a second movable panel, said second movable panel having a second movable panel outer surface, wherein the second movable panel outer surface is substantially similar to the first panel outer surface.

In yet another aspect, the structure and release mechanism are reusable and may be reset after the payload is released from the cavity.

According to a further aspect, the cavity further comprises a layer of material positioned between the payload and the moveable first panel outer surface.

In yet another aspect, the layer of material comprises a packing material.

In another aspect, the wall substantially surrounding the moveable first panel comprises more than one wall unit, with the wall units joined together.

In a further aspect, the driving force mechanism actuates a force that does not damage the payload.

In yet another aspect, the release mechanism comprises a lever, an over-center locking latch pin, centering spring or combinations thereof.

In a further aspect, the driving force mechanism is in communication with the moveable first panel and the movable first panel is in communication with the release mechanism.

In another aspect, the driving force mechanism is in direct communication with the release mechanism.

In yet another aspect, the driving force mechanism comprises a gas generator.

In still another aspect, the second plane is substantially perpendicular to the first plane.

In another aspect, the vehicle may be a manned aircraft, an unmanned aircraft, a manned spacecraft, an unmanned spacecraft, a manned terrestrial vehicle, an unmanned terrestrial vehicle, a manned surface or sub-surface water borne vehicle, an unmanned surface or subsurface water borne vehicle or combinations thereof.

In a still further aspect, a structure for deploying a payload from a vehicle is disclosed, with the structure comprising a movable panel positioned at a first location and in a first plane; at least one wall, with the wall positioned adjacent to the movable panel and the wall configured to substantially surround the moveable panel, with the wall positioned in a second plane different from the first plane, and with the moveable panel and the substantially surrounding wall bounding a cavity, with said cavity configured to contain a payload; a release mechanism in communication with the panel; and a driving force mechanism in communication with the release mechanism with the driving force mechanism configured to deliver a force adequate to activate the release mechanism, wherein the movable panel comprises a movable panel outer surface configured to substantially conform to an outer mold line of the vehicle when the movable panel is positioned at a second location after payload deployment.

In yet another aspect, the structure and release mechanism are reusable and may be reset after payload deployment.

In another aspect, a vehicle may comprise a structure for deploying a payload from the vehicle, with the structure comprising a moveable first panel positioned at a first location and in a first plane; at least one wall, with the wall positioned adjacent to the moveable first panel and the wall configured to substantially surround the moveable first panel, with the wall positioned in a second plane different from the first plane, and with the moveable first panel and substantially surrounding wall bounding a cavity, with said cavity configured to contain a payload; a second panel positioned at a second panel location and configured to close the cavity, with the second panel comprising an outer surface and configured to maintain an outer mold line of the vehicle; a release mechanism in communication with the second panel; and a driving force mechanism in communication with the release mechanism with the driving force mechanism configured to deliver a force adequate to activate the release mechanism, wherein the moveable first panel comprises a moveable first panel outer surface configured to maintain the outer mold line of the vehicle when the moveable first panel is positioned at the second location.

According to yet another aspect, the vehicle incorporating the structure for deploying a payload from the vehicle may be a manned aircraft, an unmanned aircraft, a manned spacecraft, an unmanned spacecraft, a manned terrestrial vehicle, an unmanned terrestrial vehicle, a manned surface or sub-surface water borne vehicle, an unmanned surface or subsurface water borne vehicle or combinations thereof.

BRIEF DESCRIPTION OF THE DRAWINGS

Figure 1:
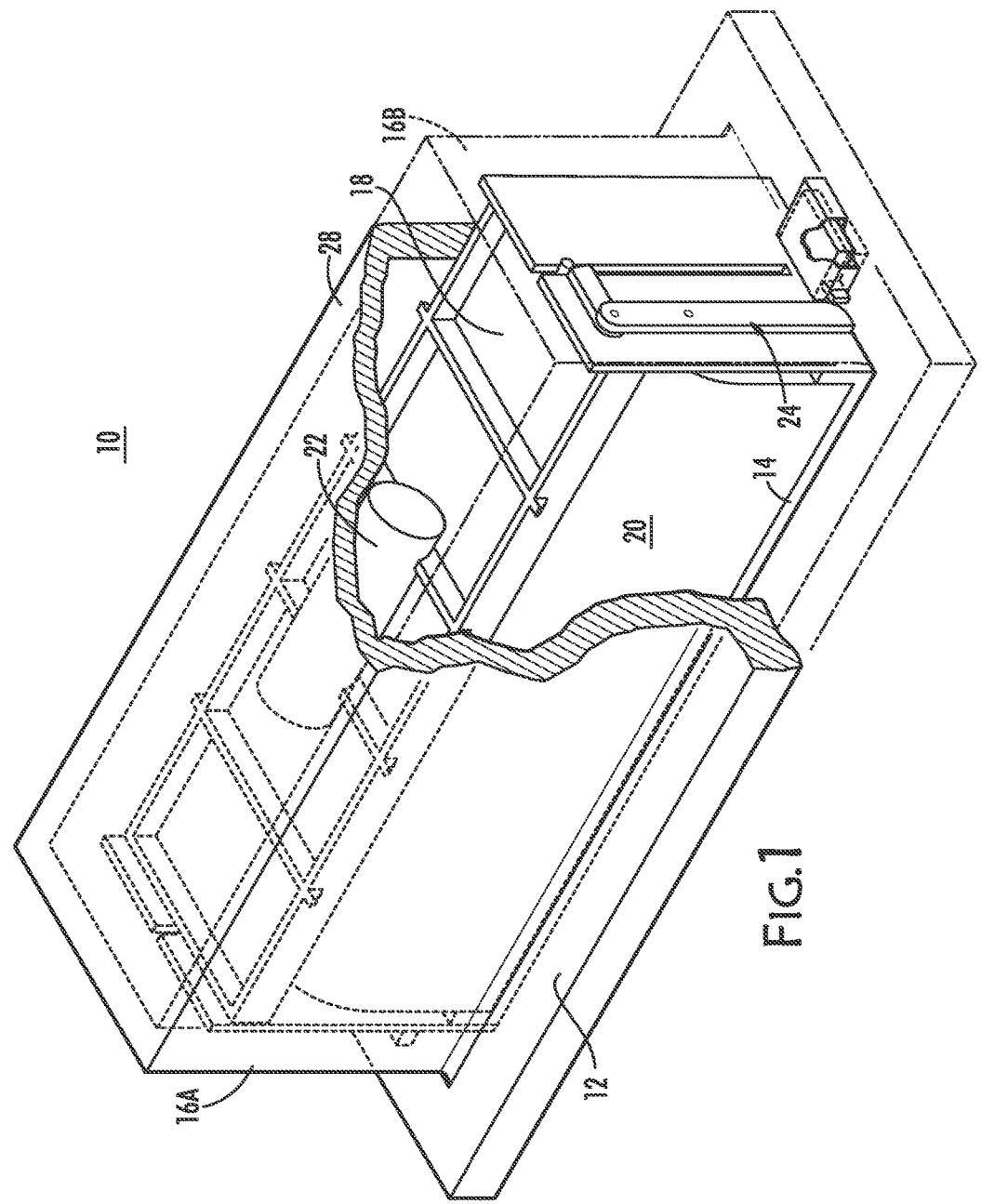
Figure 2:
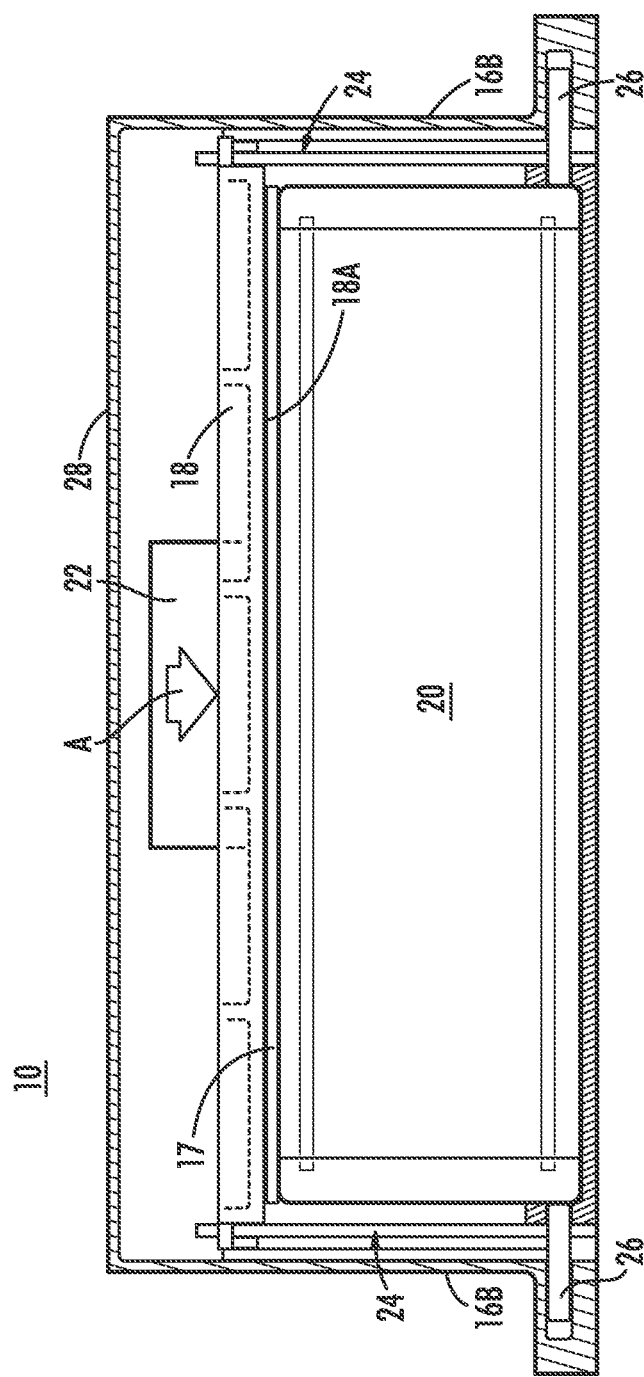
Figure 3:
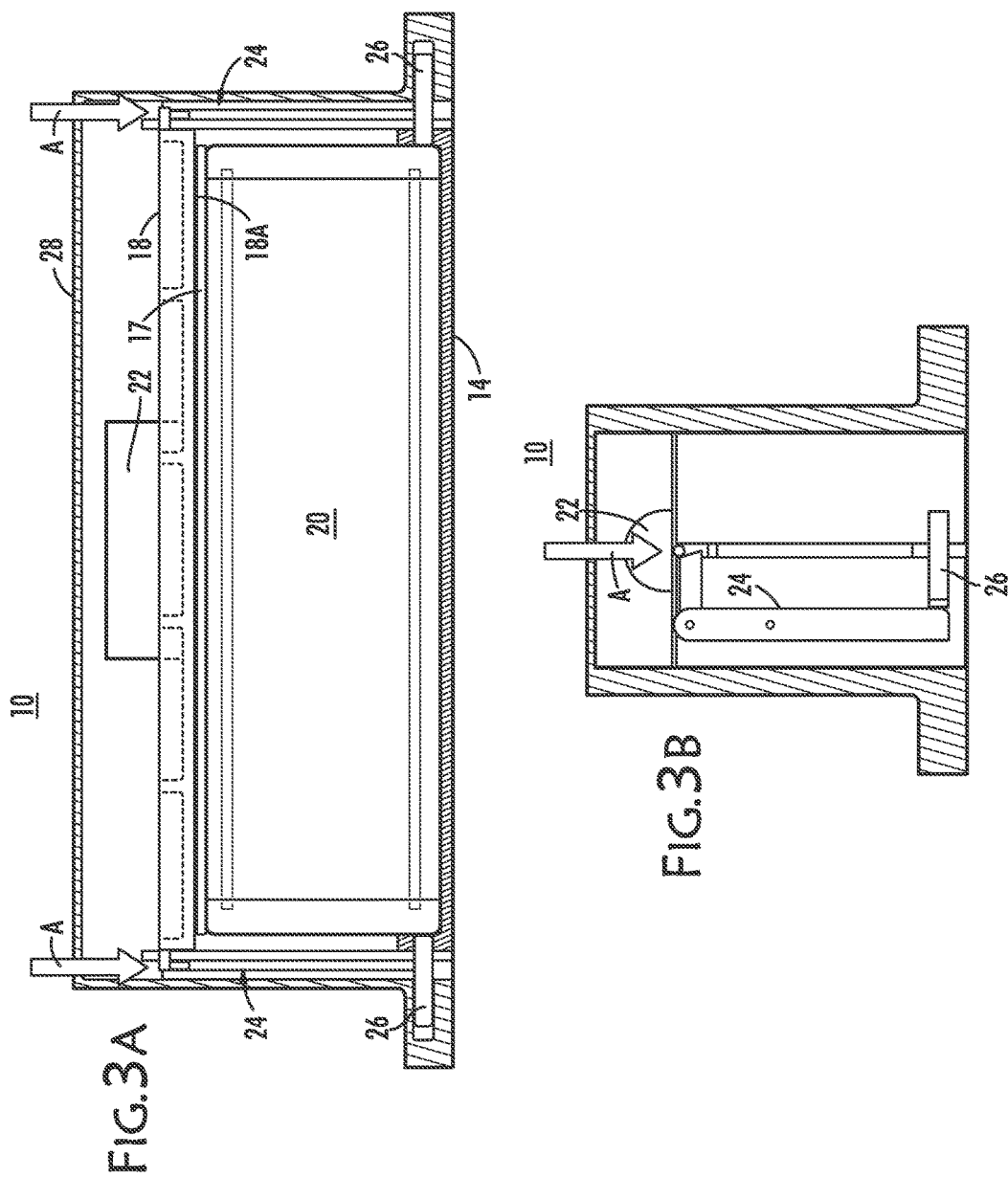

Having thus described variations of the disclosure in general terms, reference will now be made to the accompanying drawings, which are not necessarily drawn to scale, and wherein:

FIG. 1 is a perspective cutaway view of an aspect of the present disclosure;

FIG. 2 is a perspective cross-sectional side view of the device shown in FIG. 1;

FIG. 3A is a perspective cross-sectional side view of the device shown in FIG. 1, depicting a downward force being exerted on a release mechanism.

Figure 4:
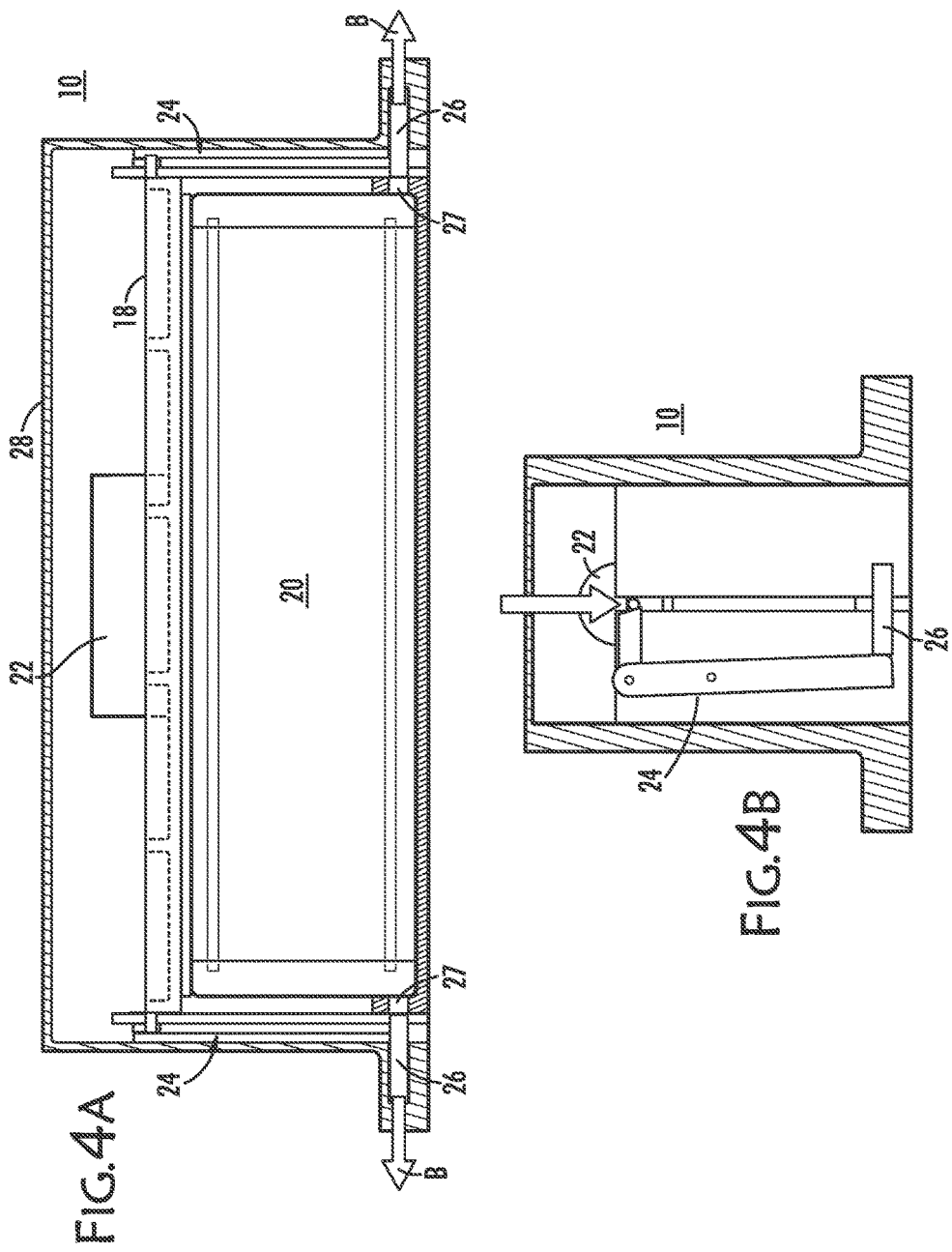

FIG. 3B is an end view of the device shown in FIG. 3A;

FIG. 4A is perspective cross-sectional side views of the device of FIG. 1 showing a release mechanism effecting a latch pin to allow movement of first panel/outer door.

Figure 5:
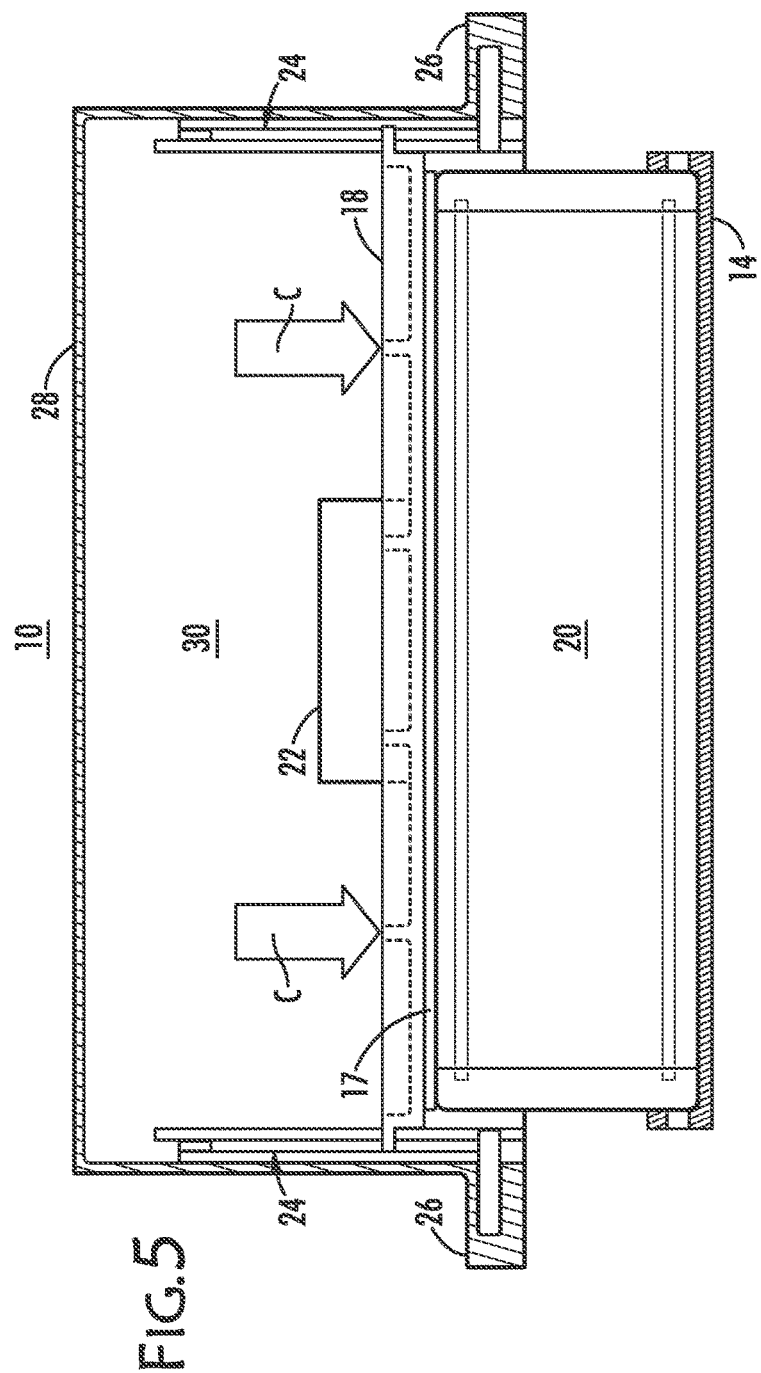
Figure 6:
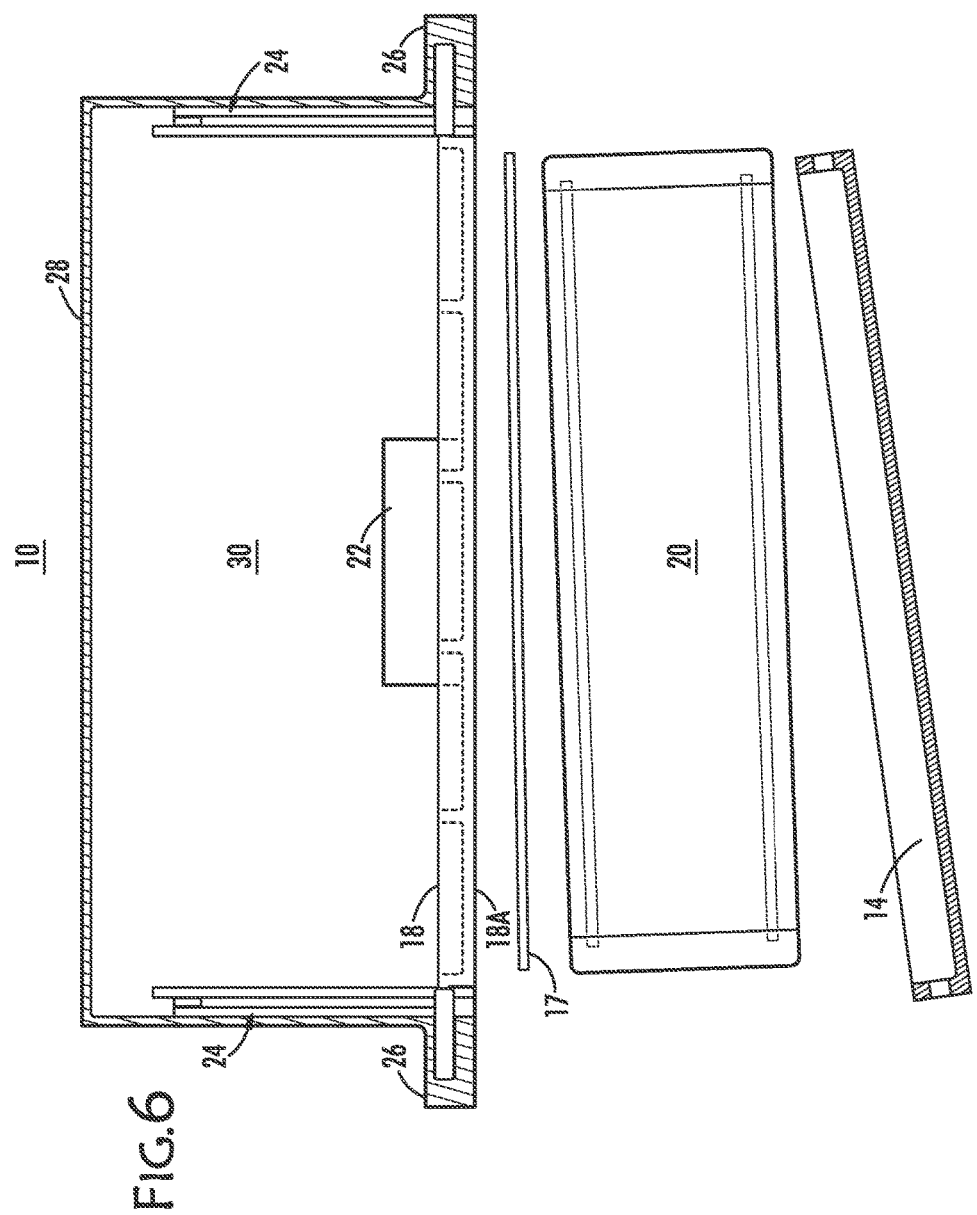
Figure 7:
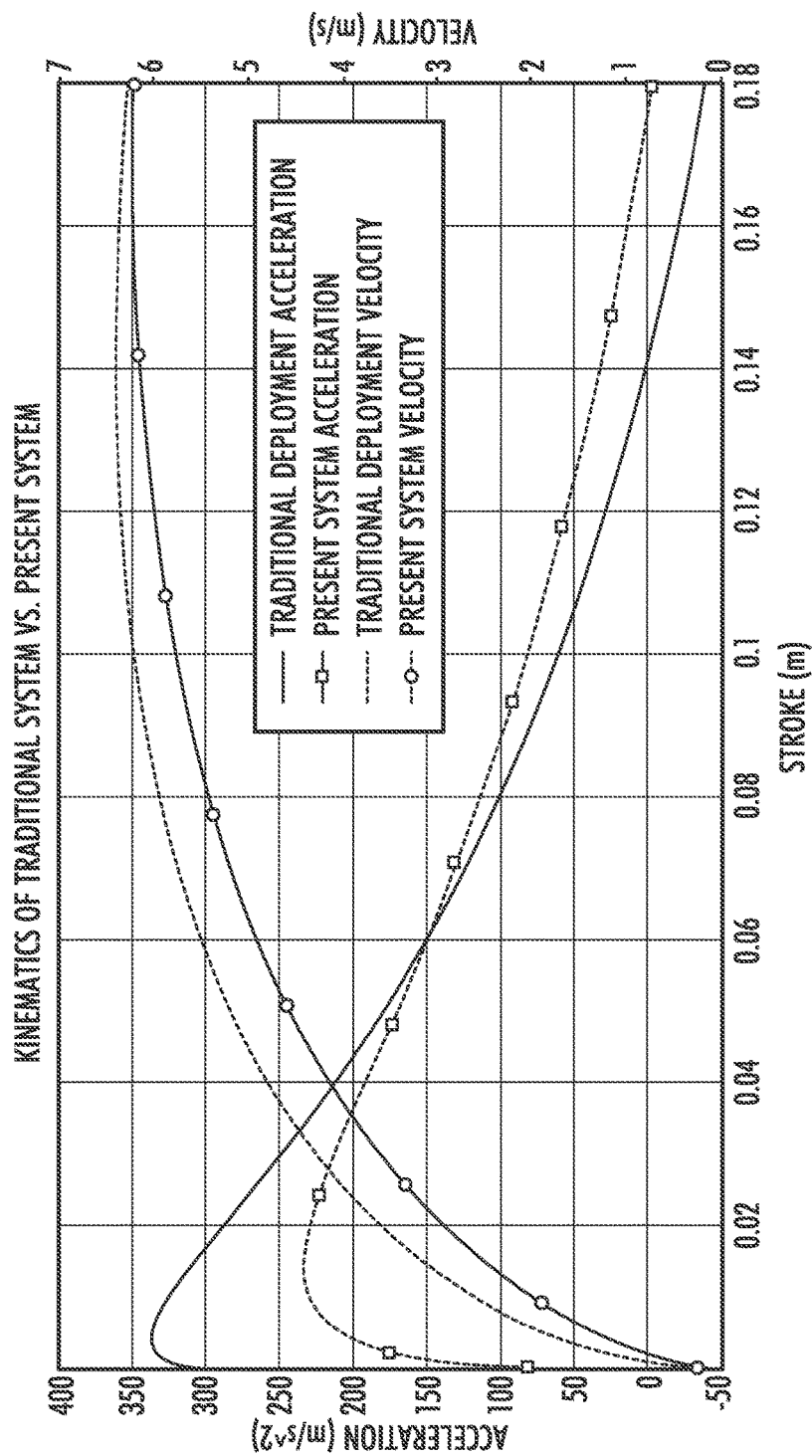
Figure 8:
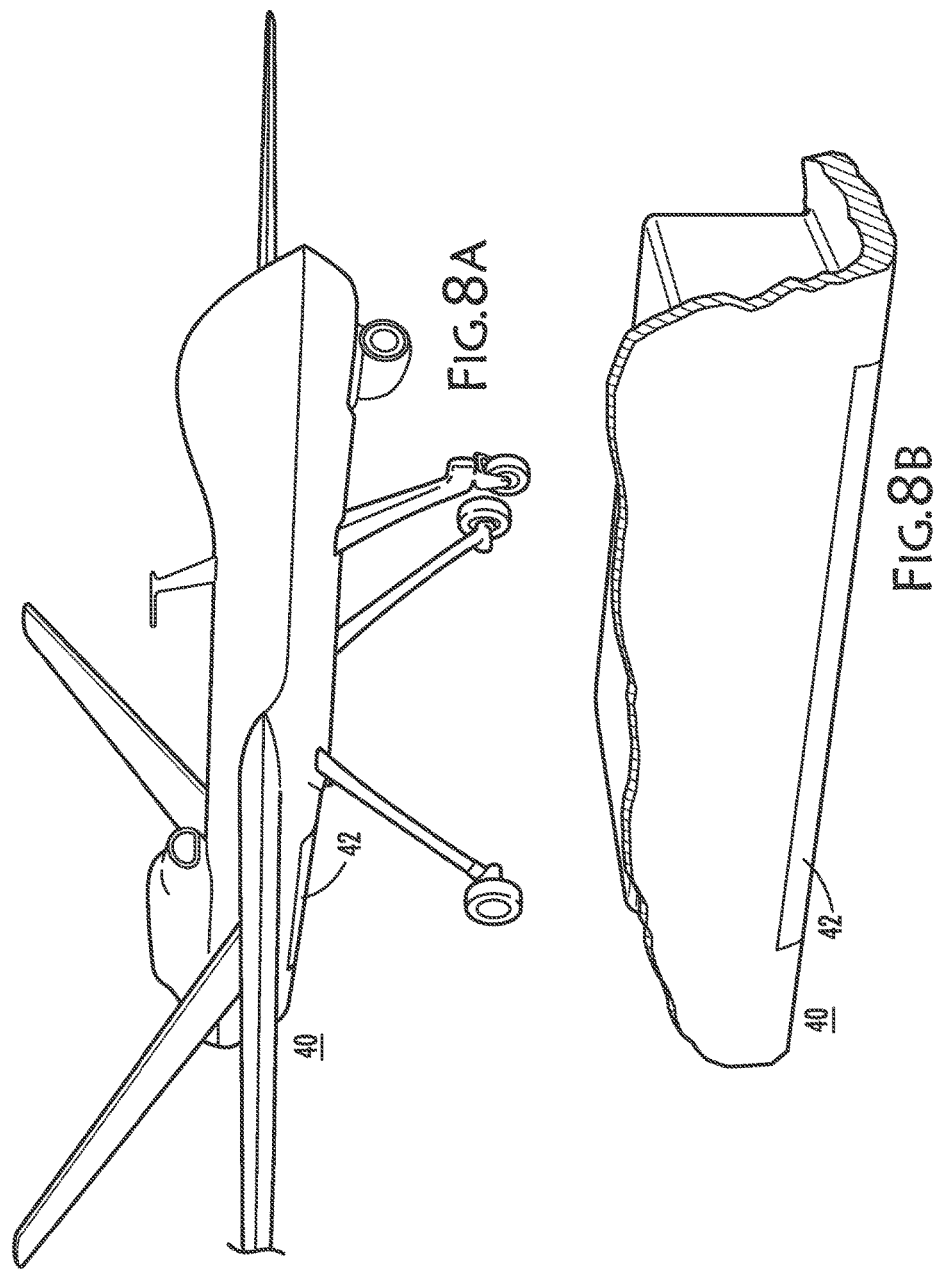
Figure 9:
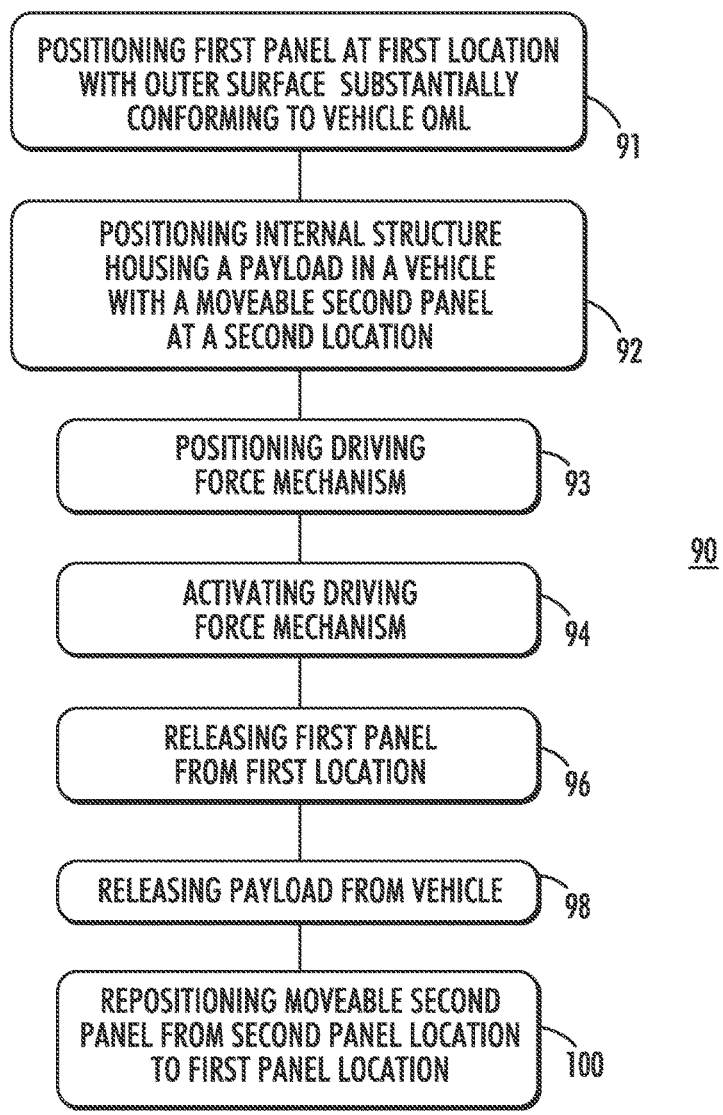
Figure 10:
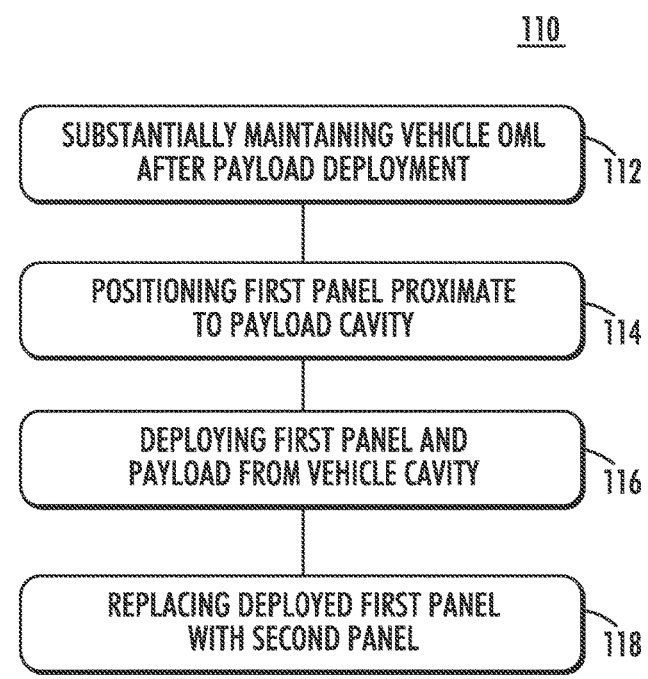

FIG. 4B is an end view of the device shown in FIG. 4A;

FIG. 5 shows the device of previous FIGS. 1-4 showing an actuator driving payload and first panel/outer door from initial payload storage position;

FIG. 6 shows payload deployment from cavity with second door positioned to maintain outer mold line;

FIG. 7 is a graph showing the payload deployment peak force requirements of known system as compared to aspects of the present disclosure;

FIGS. 8A and 8B show a representation of an aircraft showing an outer mold line preserved after payload deployment;

FIG. 9 is a flowchart outlining a method of deploying a payload from a vehicle according to an aspect of the disclosure; and FIG. 10 is a flowchart outlining a further contemplated method of deploying a payload from a vehicle according to an aspect of the disclosure.

DETAILED DESCRIPTION

According to aspects, the present disclosure is directed to methods, apparatuses and systems for ejecting a payload from a moving vehicle without permanently disrupting the OML of the vehicle, and without requiring large mechanisms or internal deployment structures, while achieving a predetermined payload deployment using a substantially reduced force that does not adversely impact a payload being deployed.

As shown in the FIGs. and otherwise described herein, a payload is housed within an internal structure located within a vehicle. The internal structure comprises a housing that comprises walls. First and second panels are in communication with the walls that, taken together are configured to bound a cavity that is dimensioned to contain a payload. The exterior surface of the first panel is understood to comprise a part of the exterior surface of a vehicle. The exterior surface of the first panel therefore is configured to conform to the vehicle's outer mold line (OML). The internal structure further comprises a driving force mechanism, such as, for example, and without limitation, a gas-driven actuator that is configured to apply force directly or indirectly to release mechanisms found in the structure. According to one aspect, the driving force mechanism applies force to a second panel, and the second panel then applies force to a release mechanism. In another aspect, the driving force mechanism is directly in communication with a release mechanism. When the required force is applied to the release mechanism, the mechanism activates a retaining mechanism such as, for example, a latch-pin, to move from a first position to a second position allowing the first panel to move from an initial position proximate to the payload cavity and allowing the first panel to release from the vehicle and exposing the payload to the external environment. The driving force mechanism may then substantially simultaneously continue to apply the force required to substantially simultaneously drive the payload from the vehicle, along with any further material, such as payload packing material, (that may have been housed along with the payload within the cavity in the internal structure of the vehicle, such as, for example an without limitation, a sabot, or an elastic material, etc.). As the payload exits the cavity, the second panel is driven through the cavity and is directed to its final, or second, location replacing the first panel. The second panel is fixed in place securely and the external surface of the second panel that is exposed to the external environment is configured to substantially conform to the OML of the vehicle in a fashion similar to that of the replaced first panel.

FIG. 1 shows an aspect of the disclosure where an internal structure 10 is mounted on platform 12. First panel 14 and walls 16A, 16B together with second panel 18 bound a cavity dimensioned to house a payload 20. Driving force mechanism 22 is shown proximate to second panel 18. Release mechanisms 24 are shown located on walls 16b, with release mechanism 24 substantially extending the height of walls 16B.

FIG. 2 shows the features of FIG. 1 in schematic detail, further depicting a packing material layer 17 disposed between the outer surface 18A of second panel 18 and payload 20. Release mechanism 24 is shown proximate to walls 16b and extending from second panel 18 to latch pins 26. The internal structure 10 is shown proximate to housing 28 integrated into the host vehicle. Arrow "A" represents the direction of the force placed on second panel 18 by driving force mechanism 22.

As shown in FIGS. 3A and 3B, the force applied to second panel 18 is transferred to release mechanism 24 and latch pins 26. It is understood that the present disclosure contemplates any means for applying a force to desirably move latch pins 26 via any release mechanism, or via remotely or directly actuating the latch pins themselves. Therefore, releasable holding mechanisms retain the first panel 14 and the payload 20 in place until an actuator is activated or otherwise engaged to enable the holding mechanism to release the first panel 14 and the payload 20 from the cavity in the internal structure 10 in the host vehicle.

According to one aspect, as shown in FIGS. 4A and 4B, the force provided from the driving force mechanism 22 to the release mechanism 24 moves latch pins 26 out of latch pin holes 28 (for example, in a direction shown by Arrows "B") allowing the first panel 14 to release from and leave the host vehicle, exposing and, if desired, substantially simultaneously releasing, payload 20 from the host vehicle. FIG. 5 shows the movement of payload 20 and second panel 18 through cavity 30 as indicated by Arrows "C". First panel 14 is shown as still momentarily engaged to payload 20.

In FIG. 6, first panel 14, payload 20 and packing material 17 are shown leaving the host vehicle and separating. Second panel 18 is shown now located securely in place at the former location of first panel 14. The outer surface 18A of second panel 18 is configured to substantially conform to the OML of the vehicle, and therefore preserves the continuity of the outer mold line of the host vehicle.

FIG. 7 is a graph that presents the normalized peak force per time (sec.) for the payload deployment from the host vehicle. In known frangible deployment systems, a significant force is required. Consequently, in such systems, since the same driving force mechanism (e.g. airbag, explosive actuator, etc.) is used to both remove an outer door/panel and eject the payload, a significant force is imparted on the payload being deployed. This peak force required to accomplish the liberation of the payload and break the frangible component(s) is greater than the force required to achieve a desired payload velocity. A payload being launched from a vehicle must reach a minimum velocity in order to safely separate from the host vehicle. This velocity is referred to as the minimum safe exit speed. In order for a given payload to achieve its associated minimum safe exit speed through a traditional frangible system, a force will be applied as shown by the dashed curve. The large peak results from the force required in order to remove the frangible element (e.g. door/panel, release bolt, etc.). Once the frangible element is breached, the net force on the payload substantially simultaneously rises to the force level that was previously acting on the frangible element(s). This causes an extremely high and often undesirable force load on the payload. The total impulse (being the force integral with time) determines the exit velocity.

According to aspects of the present disclosure, a magnitude of impulse required to achieve the minimum safe exit speed of the payload is significantly lower (almost 50% lower), since no frangible element(s) need to be breached. Therefore, according to aspects of the present disclosure, a desired payload exit velocity may be achieved without transferring a potentially damaging load to the payload. In addition, since maximum sustainable payload force is often a major design limitation of many payloads of interest, the lower force deployments required, according to aspects of the present disclosure, are advantageous.

FIG. 8A shows a drawing of an aircraft 40. The aircraft 40 has a continuous outer mold line along an underside region including panel 42 both prior to and after deployment of a payload from aircraft 40. FIG. 8B is a close-up exposed view of a section of aircraft 40 including the area of panel 42.

FIG. 9 is a flowchart outlining an aspect of the present disclosure. According to FIG. 9, a method 90 for deploying a payload from a vehicle is shown comprising, positioning a first panel at a first location, with the first panel comprising an outer surface substantially conforming to the vehicle OML 91; positioning an internal structure with a movable second panel at a second panel location, the structure housing a payload within a vehicle 92; positioning a driving force mechanism proximate to the internal structure 93, said driving force mechanism configured to deliver a force to at least one release mechanism, with the force adequate to activate the release mechanism; activating the release mechanism 94; releasing the first panel from the vehicle 96; releasing the payload from the vehicle 98; and repositioning the moveable first panel from the first panel location to the second panel location 100.

FIG. 10 is a flowchart outlining a further aspect of the present disclosure. According to FIG. 10, a method 110 for deploying a payload from a vehicle is shown comprising, substantially maintaining a vehicle outer mold line after payload deployment 112 by positioning a first panel proximate to a payload cavity 114; deploying the first panel and payload from the vehicle cavity 116; and replacing the deployed first panel with a second panel. 118.

While the accompanying FIGs. show a substantially linear (e.g. vertical) deployment of the payload from a vehicle's payload cavity, according to aspects of the present disclosure, it is understood that the payload deployment may be configured to occur in a substantially non-linear or angled fashion, if desired. In other words, according to desired deployment schemes perhaps impacted by design requirements, etc., the present disclosure also contemplates an angled internal structure (not shown), whereby a payload cavity and path from storage to deployment is not substantially rectangular but, for example, may be a parallelogram or other general configuration requiring the payload to travel horizontally or non-linearly, as well as vertically and linearly to exit the vehicle.

In addition, according to aspects of the present disclosure, it is understood and contemplated that the force from the driving force mechanism is configured to directly or indirectly impact the release mechanism without transferring substantial force to the payload itself. In this way, the force applied to the release mechanism and the payload may be applied in a predetermined fashion to achieve any desired orientation of the payload as it is deployed from the vehicle. For example, the payload may be predictably deployed with force applied evenly across the payload to achieve a substantially level payload deployment. However, the applied force may be delivered to the second panel, the release mechanism and the payload itself, alone or in combination to achieve a payload deployment wherein, for example (and without limitation) the payload arcs, tumbles, rolls, pitches, etc. in a predictable, predetermined, and desired fashion, upon or after payload deployment from the vehicle.

In addition, though not shown in the FIGs., it is further contemplated that the configuration of the internal structure housing the payload, the payload configuration, and the force applied to the release mechanism and the second panel (and the payload) can together be designed to predictably release the payload in a desired orientation as the payload is released from the vehicle. Such configuration of the internal structure can include a non-linear cavity such that the payload, during deployment, travels a distance non-linearly. Contemplated non-linear deployment via release from the cavity includes without limitation, a curved pathway, a spiral pathway, etc., to achieve a payload deployment wherein, for example (and without limitation) the payload arcs, tumbles, rolls, pitches, etc. in a predictable and predetermined fashion upon or after payload deployment from the vehicle.

According to further aspects, it will be understood by one skilled in the field that the driving force mechanism may be any actuating device, or actuator, having the ability to receive a signal or command remotely or directly, and is capable of then imparting a required and predetermined force to the components of the internal structure housing the payload, particularly, the second panel and/or the release mechanism. One contemplated driving force mechanism comprises a solid propellant gas expansion system (e.g. warm gas generator) that substantially fills a space behind/above the second panel and the payload. One contemplated generator contains a small amount of solid granulated propellant, and an electrical initiator. When the generator receives a signal, it ignites the propellant, which burns and produces high-pressure out-gassing that is ejected from the generator, for example, into a plenum adjacent to the second panel. This produces a predetermined build-up of pressure/force. The internal geometry of the propellant within the generator can be tailored to cause it to burn at an increasing or decreasing rate, allowing the total force profile over time to be customized to a particular payload. Known gas generator suppliers include Systima, General Dynamics, Nammo-Talley, and MOOG. The present disclosure contemplates gas generators comprising different fuel types including liquid and hydrazine. Further contemplated actuation systems comprise, for example, and without limitation, an hydraulic piston, a pneumatic piston, bleed gas (e.g. from another high pressure system on-board the vehicle), electric solenoid, electric lead-screw, pre-loaded spring, etc., and combinations thereof. Again, it is understood that useful gas expansion systems are understood as being tailorable to each desired payload and payload deployment orientation, based on the required or desired force profile. In other words, the systems contemplated by aspects of the present disclosure are entirely scalable; e.g. gas generators can be made for any combination of payloads and required exit velocities. The absolute force required may vary according to desired designs. However, the methods, systems and apparatuses of the present disclosure will provide a required peak force for a given payload and desired payload exit velocity that is approximately up to 50% lower than the peak force required in a payload deployment system comprising frangible components.

According to still further aspects, it will be understood by one skilled in the field that the release mechanism(s) may be any device(s) having the ability to retain a payload in place until payloads deployment is desired. Working in direct or indirect concert with the driving force mechanism, it is understood that the release mechanism will respond to the force provided by the driving force mechanism to move the release mechanism from a first position retaining the payload in place, to a second position that allows the release of a structural panel and the payload from a payload cavity in a vehicle. As a non-limiting illustration, one contemplated release mechanism uses an over-center locking latch pin that self-drives to the engaged and disengaged positions (once the latch pin is moved past the spring-centered position). The spring acts normal to the direction of travel at the center position of the latch. If the spring is toward the engaged position, the spring applies a force to engage the latch. If the spring is toward the disengaged position, the spring applies a force to disengage the latch. The latch is moved by means of a lever that acts on a canted ramp surface to provide a net force in the direction of the disengaged position. This lever is driven by pins on the second panel, that create a moment on the lever when pushed down by the force actuator. This system provides the advantage of being easily tailored to a specific payload, allowing for the minimum required ejection force. According to an aspect of the present disclosure, the contemplated release mechanisms are not damaged during payload deployment and may be reused as the payload system is rearmed with new drive force mechanisms for subsequent payload deployments. This is in strong contrast with frangible payload deployment systems that necessarily damage frangible release mechanism components, making their reuse impossible.

The various components that together comprise the internal structure defining the payload cavity can be made from any suitable material, as would be understood by one skilled in the field. For example, the first and second panels may be made from any metallic or non-metallic material, limited only by the type of material used in the construction of a vehicle exterior. Typical materials therefore include materials having the required strength and other desired characteristics, and may include, without limitation, metals, metal alloys, composite materials, ceramics, polymer-containing materials, etc. Contemplated materials further include, without limitation, aluminum, aluminum alloys, steel, titanium, titanium alloys, copper, copper alloys, Inconel, resin-based composites comprising fiberglass (types A, E, S, R, C and T), carbon fiber (chopped and continuous filament), Kevlar, polymer-containing materials, additively produced materials (e.g. fused deposition modeling (FDM) produced plastics (PEI, PEEK, PEKK), Selective Laser Sintered materials (SLS) printed plastics, metal-based AM techniques, etc.).

EXAMPLE

The kinematics shown in the graph presented herein as FIG. 7 represent a simulation of the ejection of a 5 kg payload from an air vehicle using both aspects of the presently described system, and a Traditional Frangible system. The simulation assumes that both systems use a gas generator with a constant mass flow rate of ~0.1 kg/s of gas at ambient temperature. The total stroke length of the ejection chamber for each system from which the payload is ejected is 0.15 m and the piston area is 0.023 m². For an aircraft performing 10 g maneuvers, the removal force for a traditional frangible system is assumed to be 1450 N for a 3× factor of safety. The system removal force of the present system, being largely independent of maneuver loading, is assumed to require only 40 N. The simulation was run for sea level standard day conditions. The target exit velocity was 6 m/s. FIG. 7 therefore shows that both systems achieve the target exit velocity of 6 m/s, however, the peak acceleration of the payload ejected by the present system was ~30% less than that experienced by the payload ejected via the frangible system. This details of this Example are provided for illustrative purposes only, however, it is shown that the present systems will reduce the peak force experienced by a payload by 20 to 35% vs. that of a traditional system for a given target exit velocity.

Further, although the present disclosure is primarily concerned with maintaining the outer mold line of vehicles to preserve the external integrity of the vehicle to enhance and maintain optimal performance, aspects of the present invention can also facilitate deployment of a payload from stationary structures, such as for example, generators, wind turbines, buildings, etc. It is understood that aspects of the methods, systems and apparatuses of the present disclosure are contemplated as finding utility in any and all manned and unmanned vehicles including, without limitation, aircraft, spacecraft, rotorcraft, rockets, satellites, drones, terrestrial vehicles and surface and sub-surface waterborne vehicles, and combinations thereof.

When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations. While the preferred variations and alternatives of the present disclosure have been illustrated and described, it will be appreciated that various changes and substitutions can be made therein without departing from the spirit and scope of the disclosure.

What is claimed is:

1. A method for deploying a payload from a vehicle comprising the steps of:
  positioning a first panel at a first location, with the first panel comprising a first panel outer surface configured to substantially conform to a vehicle outer mold line, said first panel in communication with at least one release mechanism;
  positioning an internal structure within the vehicle, said internal structure comprising a movable second panel positioned at a second location, with said movable second panel positioned in a first plane and positioned adjacent to at least one wall, said wall configured to substantially surround the movable second panel, and said wall positioned in a second plane different from said first plane, with said movable second panel and substantially surrounding wall bounding a cavity, said cavity configured to contain a payload, and with said first panel configured to close the cavity;
  positioning a payload in the cavity, with the payload having an upper surface adjacent to the second panel;
  positioning a driving force mechanism configured to deliver a force to at least one release mechanism, said force adequate to activate the release mechanism;
  activating the release mechanism;
  releasing the first panel from the vehicle;
  releasing the payload from the cavity substantially simultaneously with the first panel; and
  repositioning said moveable second panel from the second location to the first location;
  wherein the movable second panel comprises a moveable second panel outer surface, said movable second panel outer surface configured to substantially conform to the outer mold line of the vehicle when the movable second panel is positioned at the first location.

2. The method of claim 1, wherein the cavity further comprises a layer of material positioned between the payload and the movable second panel outer surface.

3. The method of claim 1, wherein the wall substantially surrounding the movable second panel comprises more than one wall unit, with the wall units joined together.

4. The method of claim 1, wherein the driving force mechanism actuates a force that does not damage the payload.

5. The method of claim 1, wherein the driving force mechanism is in communication with the movable second panel and said moveable second panel is in communication with the release mechanism.

6. The method of claim 1, wherein the driving force mechanism is in direct communication with the release mechanism.

7. The method of claim 1, wherein the driving force mechanism comprises a gas generator.

8. The method of claim 1, wherein the second plane is substantially perpendicular to the first plane.

9. The method of claim 1, wherein the vehicle comprises a manned aircraft, an unmanned aircraft, a manned spacecraft, an unmanned spacecraft, a manned terrestrial vehicle; an unmanned terrestrial vehicle; a manned surface and sub-surface water borne vehicle, an unmanned surface and sub-surface water borne vehicle, and combinations thereof.

10. A method for deploying a payload from a vehicle comprising the steps of:
- substantially maintaining an outer mold line of the vehicle after payload deployment by positioning a first panel having a first panel outer surface at a first location, said first panel having a first panel outer surface, said first panel located proximate to a vehicle payload cavity;
- activating a driving force mechanism to deliver a low-force necessary to activate a reusable release mechanism;
- deploying the first panel and the payload from the vehicle payload cavity; and
- replacing the deployed first panel with a second movable panel, said second movable panel having a second movable panel outer surface;
- wherein the second movable panel outer surface is substantially similar to the first panel outer surface.

11. A structure for deploying a payload from a vehicle, said structure comprising:
- a movable panel positioned at a first location and in a first plane;
- at least one wall, with said wall positioned adjacent to said movable panel, and said wall configured to substantially surround the movable panel, with said wall positioned in a second plane different from said first plane, with said movable panel and substantially surrounding wall bounding a cavity, said cavity configured to contain a payload;
- a release mechanism in communication with the panel; and
- a driving force mechanism in communication with the release mechanism, said driving force mechanism configured to deliver a force adequate to activate the release mechanism and deploy the payload;
- wherein the movable panel comprises a moveable panel outer surface, said moveable panel outer surface configured to substantially conform to an outer mold line of the vehicle when the moveable panel is positioned at a second location after payload deployment.

12. The structure of claim 11, wherein the release mechanism is reusable after the payload deployment.

13. The structure of claim 11, wherein the cavity further comprises a layer of material positioned between the payload and the movable panel outer surface.

14. The structure of claim 13, wherein the layer of material comprises a packing material.

15. The structure of claim 11, wherein the wall substantially surrounding the movable panel comprises more than one wall unit, with the wall units joined together.

16. The structure of claim 11, wherein the driving force mechanism actuates a force that does not damage the payload.

17. The structure of claim 11, wherein the driving force mechanism is in communication with the movable panel and said movable panel is in communication with the release mechanism.

18. The structure of claim 11, wherein the second plane is substantially perpendicular to the first plane.

19. A vehicle comprising the structure of claim 11.

20. The vehicle of claim 19, wherein the vehicle is selected from the group consisting of: manned aircraft, unmanned aircraft, manned spacecraft, unmanned spacecraft, manned terrestrial vehicles; unmanned terrestrial vehicles; manned surface and sub-surface water borne vehicles, unmanned surface and sub-surface water borne vehicles, and combinations thereof.

* * * * *